H. JACOB.
DEVICE FOR TAKING AIM WITH QUICK FIRING GUNS WITH PROTECTING SHIELD AND TELESCOPIC SIGHT.
APPLICATION FILED FEB. 12, 1914.

1,146,428.

Patented July 13, 1915.
2 SHEETS—SHEET 1.

H. JACOB.
DEVICE FOR TAKING AIM WITH QUICK FIRING GUNS WITH PROTECTING SHIELD AND TELESCOPIC SIGHT.
APPLICATION FILED FEB. 12, 1914.

1,146,428.

Patented July 13, 1915.
2 SHEETS—SHEET 2.

UNITED STATES PATENT OFFICE.

HEINRICH JACOB, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

DEVICE FOR TAKING AIM WITH QUICK-FIRING GUNS WITH PROTECTING-SHIELD AND TELESCOPIC SIGHT.

1,146,428.     Specification of Letters Patent.     Patented July 13, 1915.

Application filed February 12, 1914. Serial No. 818,262.

*To all whom it may concern:*

Be it known that I, HEINRICH JACOB, a citizen of the German Empire, and resident of Steglitz, near Berlin, Germany, have invented certain new and useful Improvements in Devices for Taking Aim with Quick-Firing Guns with Protecting-Shield and Telescopic Sight, of which the following is a specification.

This invention relates to a device for taking aim with quick-firing guns, especially machine-guns with protecting shield, and aims at the attainment of increased safety for the men serving the gun by diminishing as much as possible the sight aperture in the protecting shield while shortening the telescope as much as possible.

The object of the invention is attained by arranging the aperture of the protecting shield in front of the telescopic sight at a considerable distance from it at the position of the entrance-pupil of the telescope or near it. By thus increasing the distance of the protecting shield from the telescope, or the telescope from the shield, the possibility is offered of conducting all the rays lying within the objective field of view of the instrument through a sight aperture of small diameter, while at the same time the telescope can be kept very short. As with such an arrangement of the entrance-pupil at a considerable distance from the telescope the rays coming from an object-point only traverse one part of the objective, a comparatively large diameter, greater than the diameter of the entrance-pupil, can be given to the objective without detriment to the quality of the images; upon which depends the attainment of a sufficiently large field of view and an adequate clearness of the image, when the entrance-pupil is moved further away.

Figure 1:
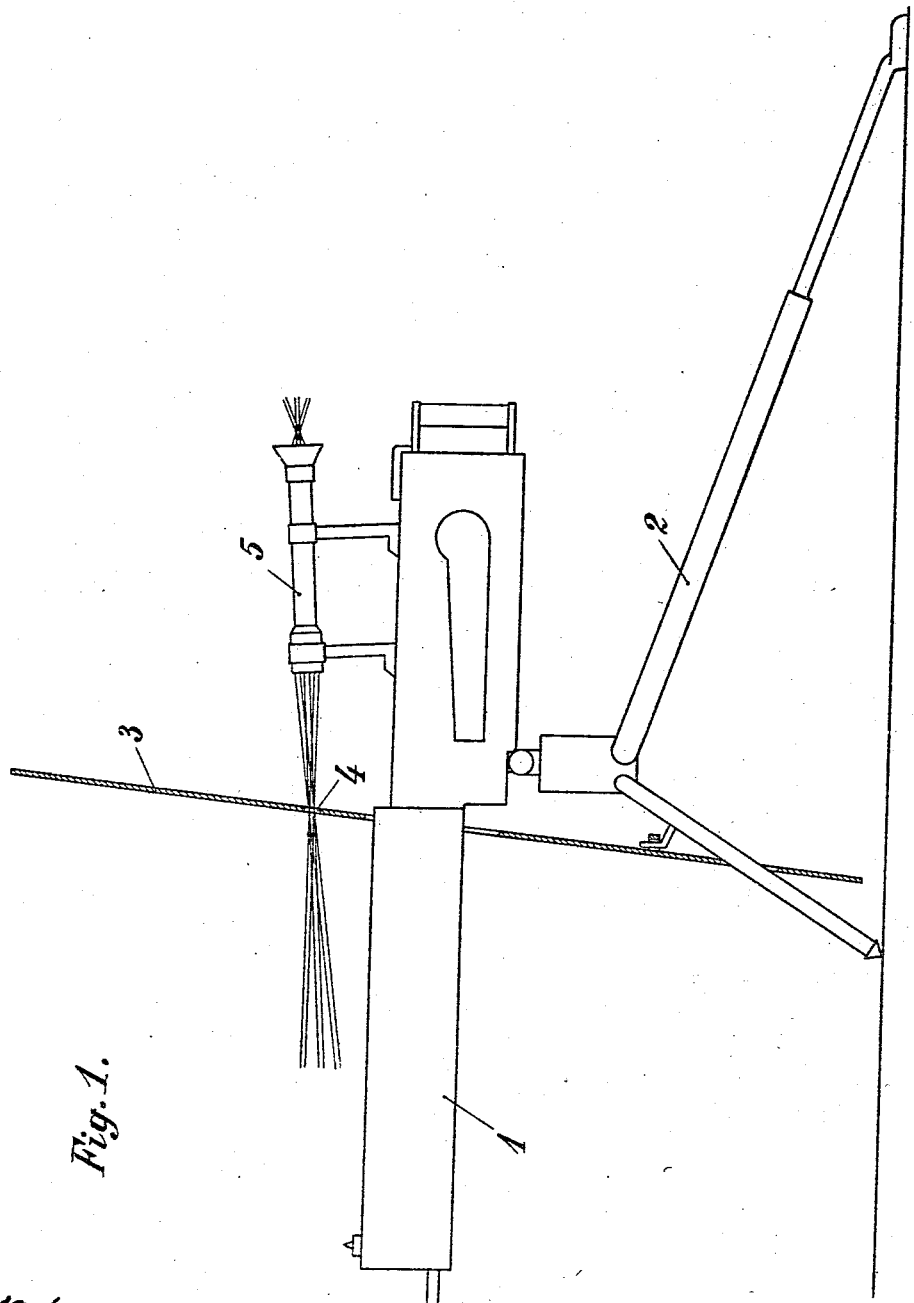
Figure 2:
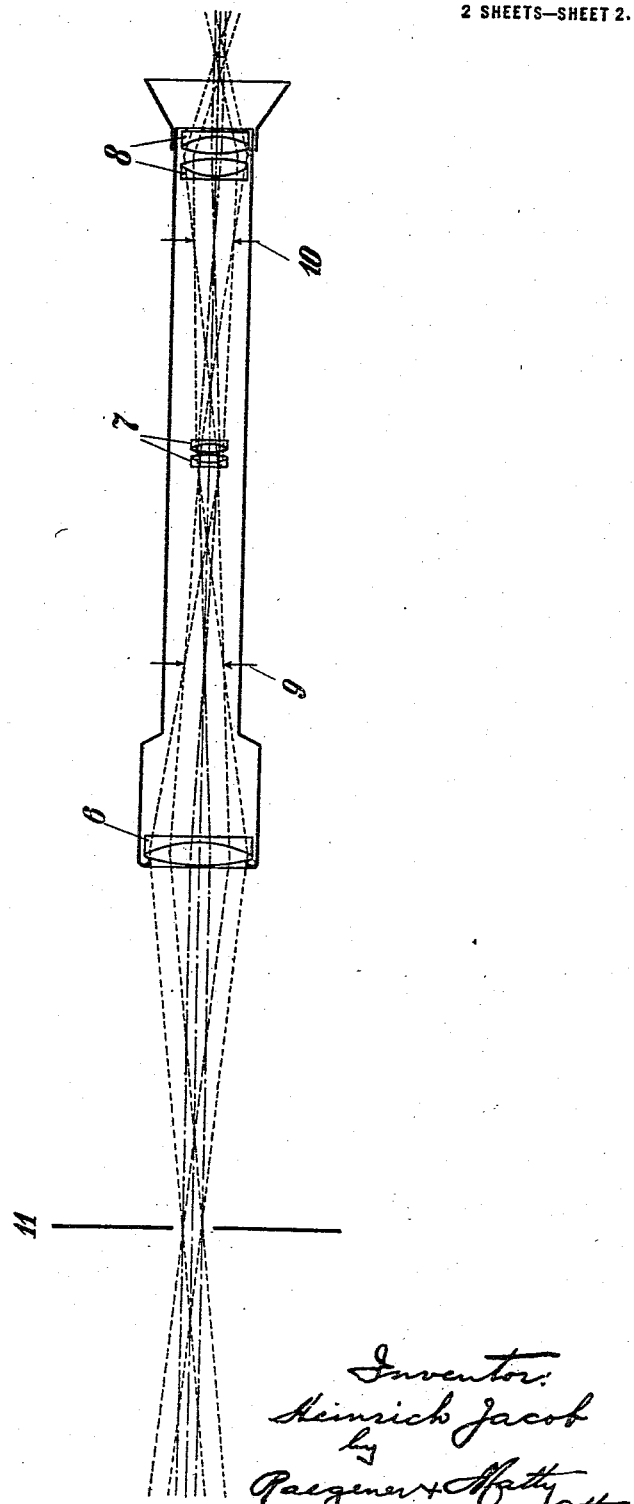

In the accompanying drawing forming part of this specification, Figure 1 shows a machine gun having a telescopic sight mounted thereon, the stand carrying the machine-gun being shown in diagrammatic elevation and the protecting shield in section. Fig. 2 is a diagrammatic longitudinal section through one form of telescopic sight showing a protecting shield in front thereof and the path of a bundle of parallel light rays passing through the telescope from distant objects.

In Fig. 1 the machine-gun is marked 1, and is shown mounted on a stand 2; the shield is marked 3, the sight aperture 4. On the machine-gun is situated the telescopic sight 5 at a considerable distance behind the shield in such a position that the entrance-pupil of the telescope 5 coincides with the sight aperture 4 in the shield.

In the instrument shown in Fig. 2 the objective is marked 6, the inversion system 7 and the ocular 8. The image planes of the telescope are indicated at 9 and 10. The path of the rays marked in the figure shows that the entrance-pupil is situated in the plane 11 at a considerable distance in front of the objective 6. This distance is greater than one-third of the length of the telescope and must in practice be at least so large, if it is not wished that the telescope should be of disadvantageous dimensions, as the distance of the telescope ocular or of the exit-pupil from the shield is decided by the dimensions of the gun.

What I claim is:—

1. Device for taking aim with quick-firing guns with protection shield comprising a gun, a protecting shield provided with a sight aperture, a telescopic sight arranged at a considerable distance from said protecting shield and having its entrance-pupil substantially coinciding with the sight aperture within the shield.

2. Device for taking aim with quick-firing guns with protecting shield comprising a gun, a protecting shield provided with a sight aperture, a telescopic sight arranged at a considerable distance from said protecting shield and having its entrance-pupil substantially coinciding with the sight aperture within the shield, the sight aperture of the shield being of smaller diameter than the objective of the telescope.

3. Device for taking aim with quick-firing guns with protecting shield comprising a gun, a protecting shield provided with a sight aperture and a telescopic sight in such arrangement with relation to said gun and protecting shield that its entrance-pupil substantially coincides with the sight aperture within the shield and that the distance of its objective from the shield is not less than a third of the length of the telescope.

In testimony whereof I have signed this specification in the presence of two subscribing witnesses.

HEINRICH JACOB.

Witnesses:
 WOLDEMAR HAUPT,
 HENRY HASPER.